United States Patent
Ghanbarinejad et al.

(10) Patent No.: US 10,321,421 B2
(45) Date of Patent: Jun. 11, 2019

(54) SYSTEM AND METHOD FOR SYNCHRONIZATION AND LINK ACQUISITION IN CELLULAR WIRELESS SYSTEMS WITH DIRECTIONAL ANTENNAS

(71) Applicant: FutureWei Technologies, Inc., Plano, TX (US)

(72) Inventors: Majid Ghanbarinejad, Rolling Meadows, IL (US); Qian Cheng, Naperville, IL (US); Lukasz Krzymien, Rolling Meadows, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 16 days.

(21) Appl. No.: 15/799,932

(22) Filed: Oct. 31, 2017

(65) Prior Publication Data

US 2018/0124725 A1    May 3, 2018

Related U.S. Application Data

(60) Provisional application No. 62/417,122, filed on Nov. 3, 2016.

(51) Int. Cl.
*H04W 56/00* (2009.01)
*H04W 36/04* (2009.01)
(Continued)

(52) U.S. Cl.
CPC ........ *H04W 56/0005* (2013.01); *H04B 7/043* (2013.01); *H04B 7/0617* (2013.01);
(Continued)

(58) Field of Classification Search
CPC .......... H04W 56/0005; H04W 56/001; H04W 76/15; H04W 36/08; H04W 36/165;
(Continued)

(56) References Cited

U.S. PATENT DOCUMENTS 6,628,235 B2 * 9/2003 Wight ..................... H01Q 3/00
  342/374
9,794,902 B2 * 10/2017 Shen .................... H04B 7/0617
(Continued)

FOREIGN PATENT DOCUMENTS

| WO | 2016041492 A1 | 3/2016 |
| WO | 2016044991 A1 | 3/2016 |
| WO | 2016119201 A1 | 8/2016 |

OTHER PUBLICATIONS

Huawei, et al., "Network Synchronization for NR", 3GPP TSG RAN WG1 Meeting #87, R1-1611682, Reno, NV, Nov. 14-18, 2016, 4 pages.

*Primary Examiner* — Ahmed Elallam
(74) *Attorney, Agent, or Firm* — Slater Matsil, LLP

(57) ABSTRACT

A system and a method for synchronization and link acquisition in cellular wireless systems with directional antennas are disclosed. In an embodiment a method for wireless communication includes synchronizing, by a first network controller, transmission of a first synchronization signal with transmission of a second synchronization signal from another network controller.

26 Claims, 13 Drawing Sheets

(51) Int. Cl.
*H04W 36/08* (2009.01)
*H04W 36/16* (2009.01)
*H04W 76/15* (2018.01)
*H04B 7/04* (2017.01)
*H04B 7/06* (2006.01)
*H04B 7/0426* (2017.01)
*H04W 36/36* (2009.01)

(52) U.S. Cl.
CPC ........... *H04W 36/04* (2013.01); *H04W 36/08* (2013.01); *H04W 36/165* (2013.01); *H04W 76/15* (2018.02); *H04W 36/36* (2013.01)

(58) Field of Classification Search
CPC .... H04W 36/04; H04W 36/36; H04B 7/0897; H04B 7/0617; H04B 7/043
See application file for complete search history.

(56) References Cited

U.S. PATENT DOCUMENTS

| | | | |
|---|---|---|---|
| 9,930,656 B2* | 3/2018 | Niu | H04B 17/318 |
| 9,998,191 B2* | 6/2018 | Mizusawa | H04L 5/0023 |
| 2016/0080060 A1* | 3/2016 | Yu | H04B 7/0626 455/452.2 |
| 2016/0360463 A1* | 12/2016 | Kim | H04B 7/0617 |
| 2017/0195033 A1 | 7/2017 | Zhang et al. | |
| 2017/0251441 A1* | 8/2017 | Axnas | H04W 56/001 |

\* cited by examiner

SYSTEM AND METHOD FOR SYNCHRONIZATION AND LINK ACQUISITION IN CELLULAR WIRELESS SYSTEMS WITH DIRECTIONAL ANTENNAS

This application claims priority to U.S. Provisional Patent Application No. 62/417,122, filed Nov. 3, 2016, and entitled "System and Method for Synchronization and Link Acquisition in Cellular Wireless Systems with Directional Antennas," which application is incorporated herein by reference.

TECHNICAL FIELD

The present disclosure relates to a system and method for wireless communications, and, in particular embodiments, to a system and method for synchronization and link acquisition in cellular wireless systems with directional antennas.

BACKGROUND

In order to connect to a wireless cellular system such as high-speed packet access (HSPA) and long-term evolution (LTE), the user equipment (UE) conventionally searches for signals transmitted by network (infrastructure) entities such as base stations (BSs) or transmitter-receiver points (TRPs). The term TRP is used herein to refer to any network component or network controller such as a base station or access point.

The first signals acquired and detected by the UE are called synchronization (sync) signals whose role is to communicate important information to the UE, e.g., a cell identifier (ID), symbol and frame timing information, etc. A sync signal in this disclosure may refer to a set of one or more signals that communicate such information and may or may not occupy consecutive time and/or frequency resources. An example is the long-term evolution (LTE) system where a sync signal is composed of a primary sync signal (PSS) and a secondary sync signal (SSS), which may or may not occupy successive symbol times depending on the system configuration. Once a UE obtains such information by detecting a sync signal from a TRP, it can initiate a connection procedure to the TRP.

Due to mobility and other phenomena impacting the channel quality, a UE may need to connect to, or benefit from connecting to, another TRP while staying connected to the same network. This procedure is called handover. For this purpose, a UE maintains a list of potential handover destinations and their channel quality by continuously listening to the wireless medium and detecting sync signals from nearby TRPs. This information can be reported to the network through the TRP currently serving a UE. The network or the UE can then decide whether and when a handover is necessary or beneficial.

SUMMARY

An embodiment of the disclosure provides a method for wireless communication, wherein the method includes synchronizing, by a first transmitter-receiver point (TRP), and transmission of a first sync signal with transmission of a second sync signal by another TRP.

Another embodiment of the disclosure provides a method for wireless communication, wherein the method includes transmitting, by a network controller, reference signals (RS) for beam management to a user equipment (UE), receiving, by the network controller, a plurality of reported beams from the UE and signaling, by the network controller, scheduling instructions to the UE based on the received beams so that the UE is configured to search for synchronization signals with at least one first beam using a first antenna set while still being able to receive bearer data with at least one second beam using a second antenna set during a first time period for synchronization, wherein the first antenna set and the second antenna set are non-overlapping.

Yet another embodiment of the disclosure provides a method for wireless communication, wherein the method includes receiving, by a user equipment (UE), reference signals (RS) for beam management from a network controller, reporting, by the UE, a plurality of beams to the network controller and receiving, by the UE, scheduling instructions from the network controller based on the sent beams so that the UE is configured to search for synchronization signals with at least one first beam using a first antenna set while still being able to receive bearer data with at least one second beam and using a second antenna set during a first time period for synchronization, wherein the first antenna set and the second antenna set are non-overlapping.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

When antenna(s) of a user equipment (UE) are able to listen to all directions to receive synchronization (sync) signals from nearby transmission points (TRPs), the sync signal detector in the UE can detect sync signals even in the presence of interfering signals providing that the signal quality is sufficiently high and the interference is not too severe. However, if antenna(s) of a UE are unable to listen to all directions at a time, there is a nonzero probability that the UE misses to detect sync signals from a nearby TRP. An example of this situation is when a UE uses directional antennas or, equivalently, adopts beamforming at its antenna(s) when listening to the wireless medium. In this scenario, since the UE is directing its "listening beam" towards its serving TRP, it may not be able to receive sync signals from nearby TRPs, hence missing a chance to perform handover when a TRP with better channel quality is available.

This problem is particularly important in the case of millimeter-wave (mmWave) access systems where the use of directional antennas and analog beamforming is practically inevitable due to lower link budget compared to legacy microwave systems operating at lower frequencies, e.g., lower than 6 GHz.

Figure 1A:
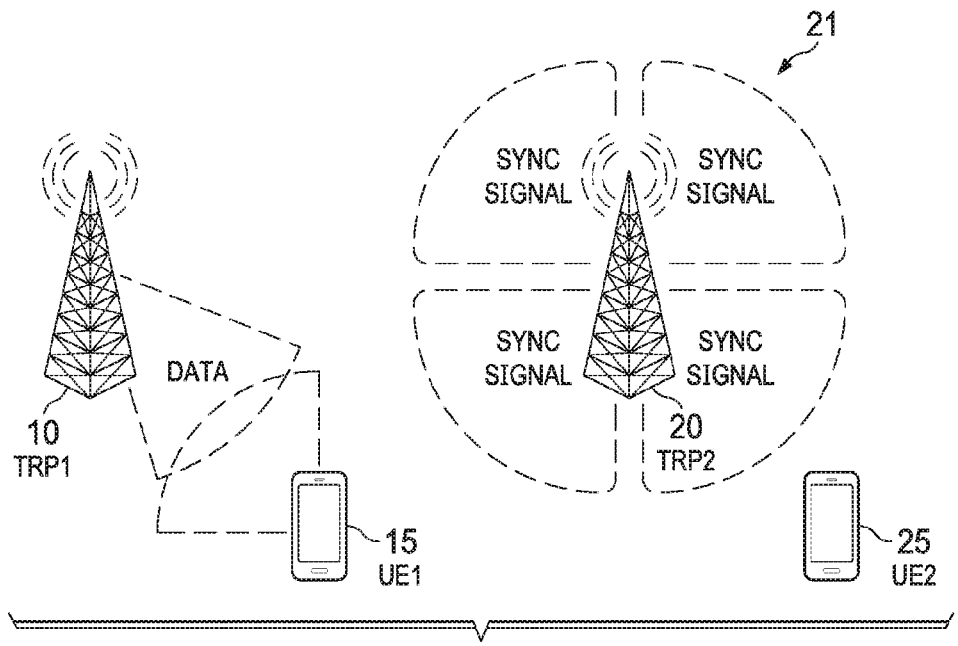
FIGS. 1A and 1B illustrate sync signal acquisition failure when a connected UE is employing analog beamforming.
Figure 1B:
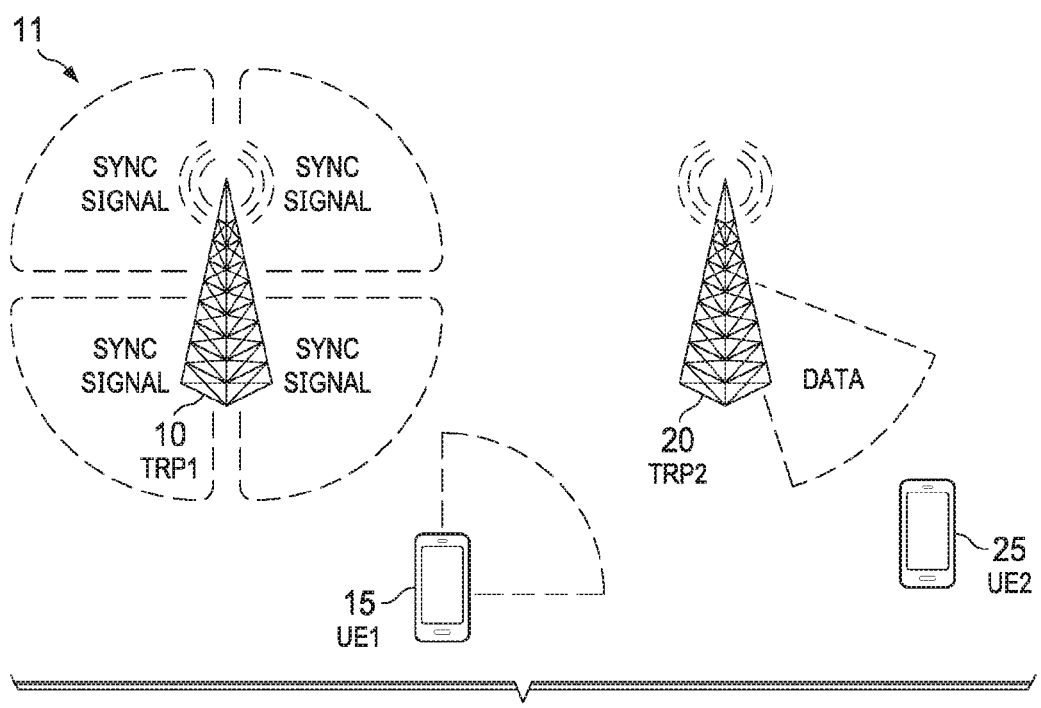

The issue is illustrated in FIGS. 1A and 1B, in which each TRP 10, 20 transmits multiple sync signals and/or multiple copies of a sync signal 11, 21 in multiple directions either by using one antenna sequentially or by using multiple antennas simultaneously or a combination thereof. FIGS. 1A and 1B illustrate sync signal acquisition failure when a connected UE 15, 25 is employing analog beamforming. In FIG. 1A, UE1 15 is receiving data from (its serving) TRP1 10 and is unable to receive sync signals 21 from the nearby TRP2 20. Subsequently, in FIG. 1B, when UE1 15 searches for sync signals 21 from nearby TRPs, TRP2 20 is not transmitting sync signals 21.

Figure 2:
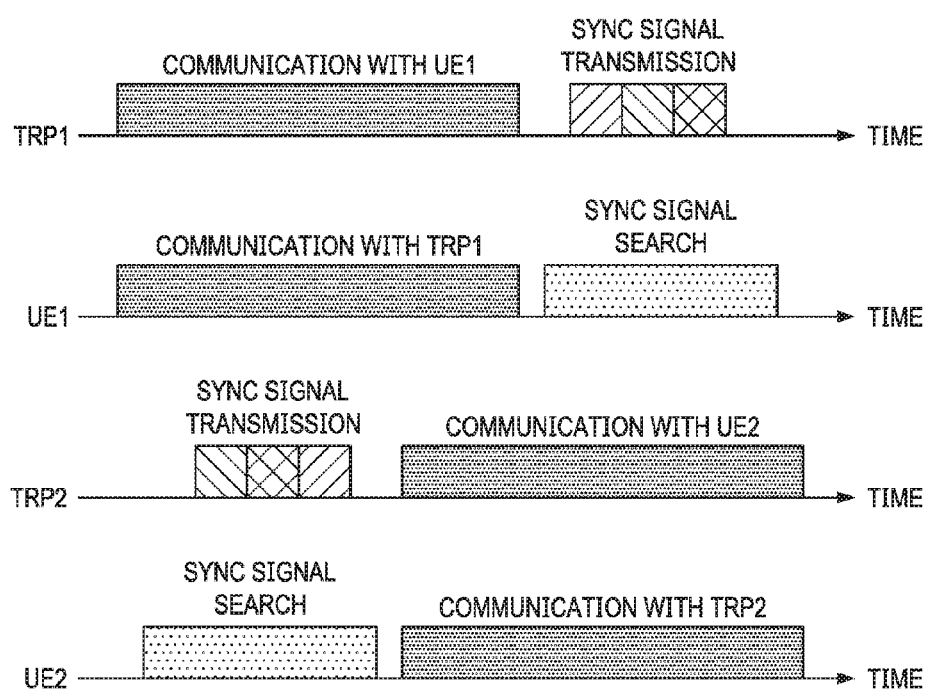
FIG. 2 illustrates an example timeline corresponding to communications of FIG. 1.

FIG. 2 illustrates an example of a timeline corresponding to communications in FIGS. 1(A and B). Different shading patterns in sync signal transmission correspond to multiple sync signals and/or multiple copies of a sync signal transmitted to different directions. As can be seen from FIG. 2, TRP1 10 and TRP2 20 send sync signals at different times and their respectively connected UEs, UE1 15 and UE2 25, search for the sync signal at different times.

Various embodiments of the disclosure provide transmission of sync signals from various TRPs wherein the TRPs coordinate the transmission of the sync signals. For example, the sync signals from the various TRPs may be transmitted during a time interval such as a synchronization-signal-dedicated interval (SSDI). The SSDI may be transmitted between two time intervals in which each TRP communicates with their connected UEs by transmitting bearer data and control data (other than sync signals). Transmitting sync signals during a defined SSDI is advantageous because the UE is able or has a near 100% certainty to detect the sync signal(s) with its directional antenna.

Various other embodiments of the disclosure provide a higher layer/antenna communication between a TRP and a UE during a communication period and a lower layer/antenna communication during a reduced-layer communication interval (RLCI). During the RLCI the UE may use the freed up layer(s)/antenna(s) for searching for sync signals of other TRP(s). After the RLCI, the UE may switch back to a higher layer/antenna communication. The TRP and the UE may communicate via a first and a second beam pair during a high layer/antenna communication and via a first beam pair during the RLCI. Alternatively, the TRP and UE may communicate via a first and a second beam pair during a high layer/antenna communication and via a third beam pair during the RLCI, wherein third beam pair is different than the first and second beam pairs. Having the UE receiving sync signals during t RLCI with a first antenna/layer set while at the same time receiving data with a second antenna/layer set is advantageous since such a method is very efficient and provides uninterrupted data transmission.

Figure 3A:
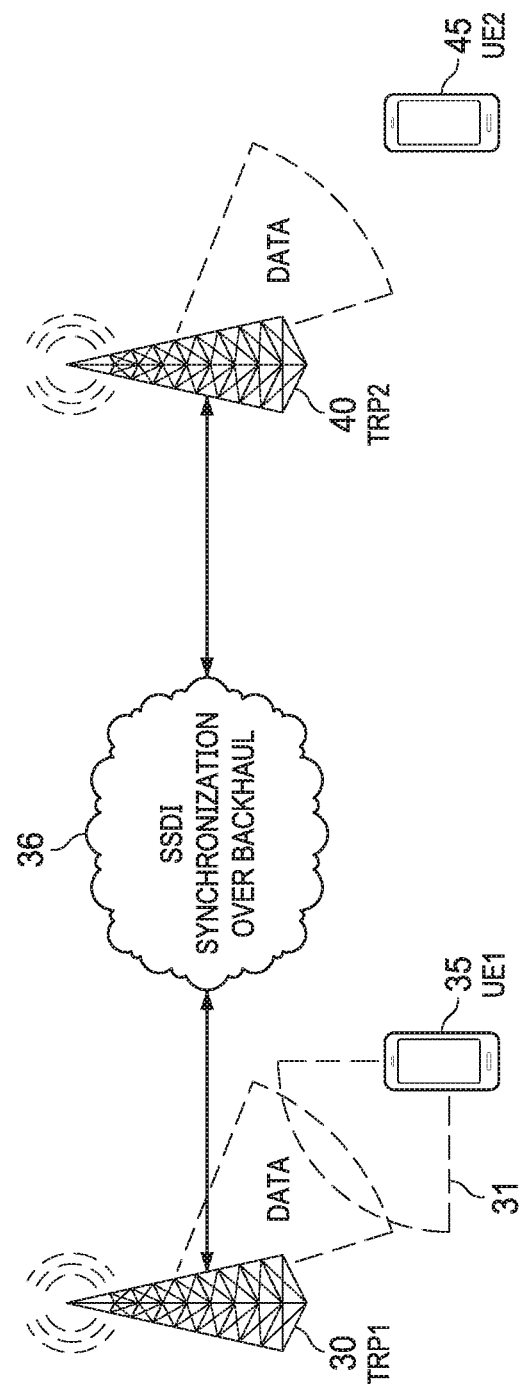
FIGS. 3A and 3B illustrate an embodiment of the disclosure where TRP1 and TRP2 communicate with UE1 and UE2.
Figure 3B:
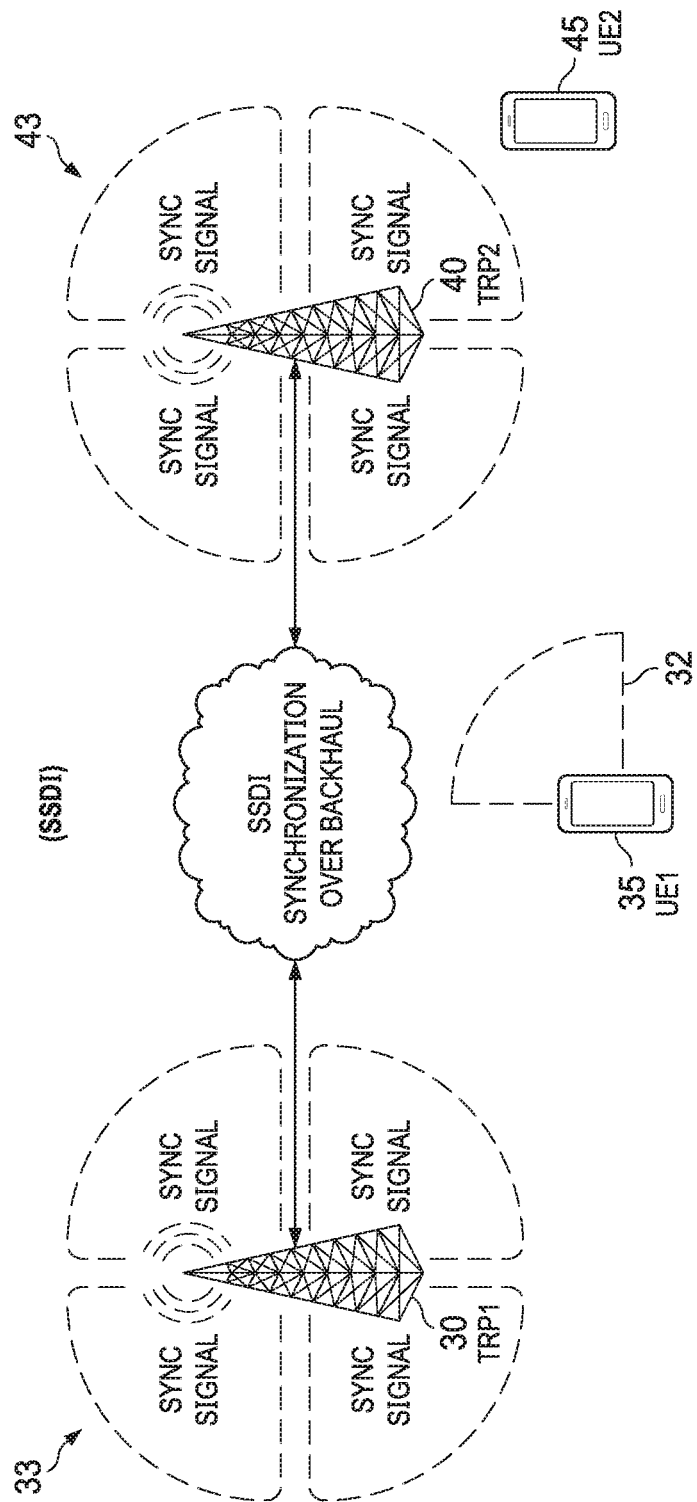

FIGS. 3A and 3B show an embodiment of the present disclosure. Multiple TRPs (TRP1 30 and TRP2 40) in a vicinity of a UE1 30 synchronize their sync signal transmissions or limit those transmissions to specific time periods (e.g., intervals). The TRPs 30, 40 synchronize their sync signal transmission over the backhaul 36 (e.g., X2 interface). The TRPs may send the sync signals only at a synchronization-signal-dedicated interval (SSDI) between two communication time periods. These intervals may be configured over the backhaul 36. During SSDIs, the UE1 35 can change its antenna beam(s) 31, 32 and search for sync signals 33, 43 from some or all other directions. These directions may be different than the direction covered by the serving TRP1 30. If a TRP 30, 40 has the capability to use multiple beams through any of its antennas, it may choose to switch from one beam to another beam during an SSDI for transmitting multiple sync signals or multiple copies of a sync signal 33, 43. A UE 35, 45 may also choose to switch beams through its antenna(s) during an SSDI in order to increase the number of directions it listens to. The order of beams by the TRP 30, 40 and/or the UE 35, 45 may be known a priori or may be decided by the TRP 30, 40 and/or the UE 35, 45 at each point.

FIG. 3A illustrates TRP1 30 and TRP2 40 communicating (by sending bearer data or control data) with UE1 35 and UE2 45, respectively. FIG. 3B illustrates TRP1 30 and TRP2 40 transmit sync signals 33, 43 during an SSDI. UE1 35 connected to its serving TRP1 30 can successfully detect sync signals 43 from TRP2 40 during an SSDI.

Figure 4:
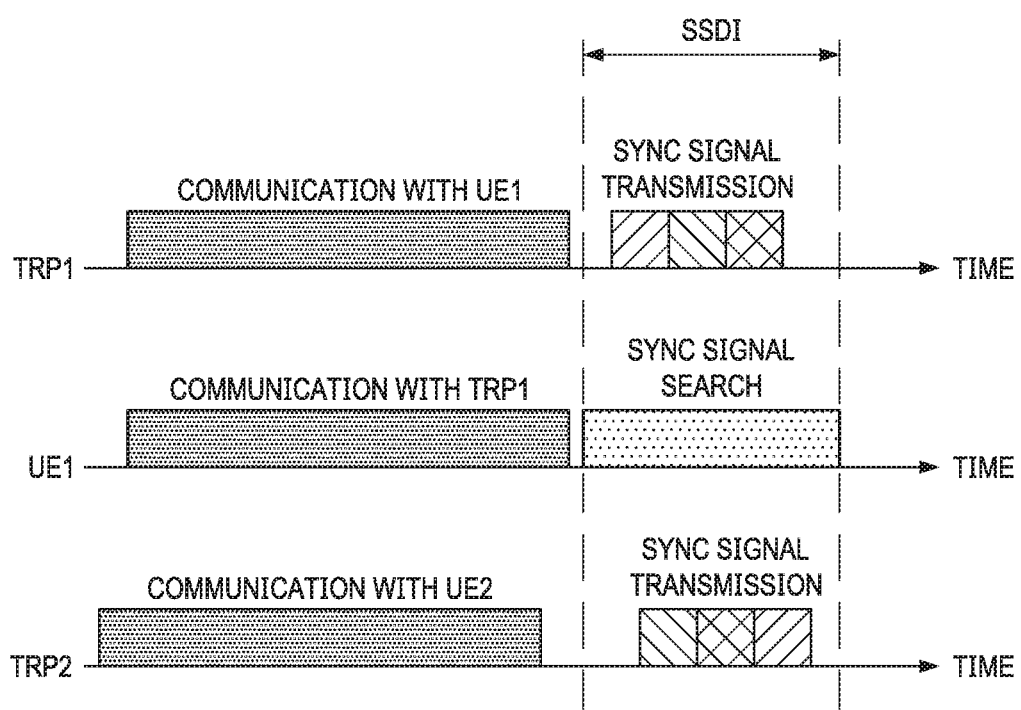
FIG. 4 illustrates an example timeline corresponding to communications of FIGS. 3 (3A and 3B) according to an embodiment.

FIG. 4 illustrates an example of a timeline corresponding to communications in FIG. 3. Different shading patterns in sync signal transmission can correspond to multiple beams (sync signals and/or multiple copies of a sync signal) transmitted to different directions. In particular, FIG. 4 shows TRP1 and TRP2 sending three different sync signals (in three different beams) while UE1 only searches with one beam. However, in various other embodiments, UE1 can search with different beams and the TRPs can send sync signals in just one or a plurality of different beams.

Reduced-Layer Communication Interval

Figure 5:
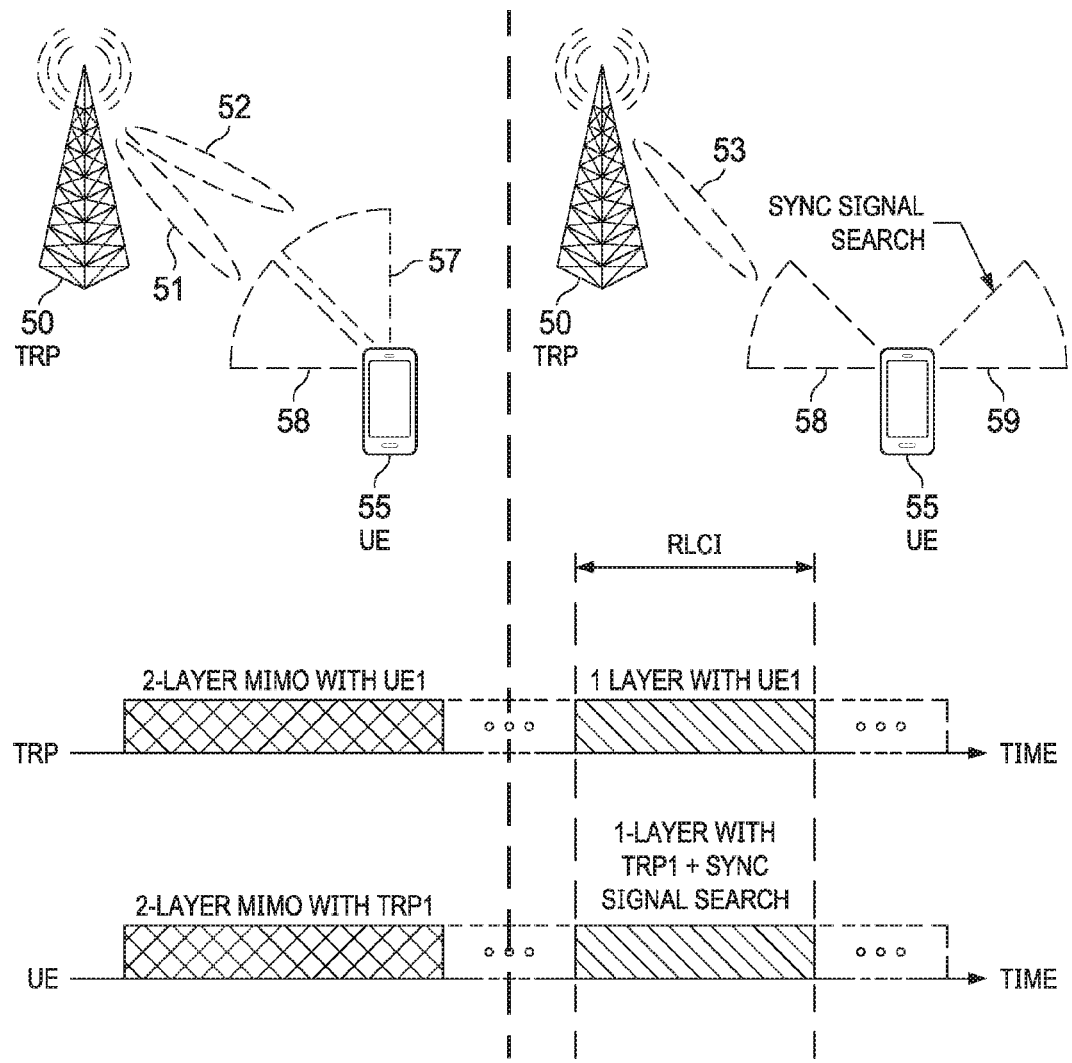
FIG. 5 illustrates an example of a reduced-layer communication interval (RLCI) according to an embodiment.

FIG. 5 shows yet another embodiment of the present disclosure. A serving TRP 50 may use certain time periods for the UE 55 to search for sync signals from other TRPs. During these periods, the TRP 50 either (1) does not allocate resources for communication (bearer data or control data) with the UE 55, or (2) reduces the number of antennas (represented by associated beams, e.g., from 2 beams 56, 57 to one beam 58) required by the UE 55 for receiving data if the UE 55 has multiple antennas. Therefore, during these time periods, the UE 55 will have one or multiple antennas (and associated beam(s) 59) that are not busy communicating with the serving TRP 50 and will be available for detecting sync signals from one or multiple directions other than the direction covered by the serving TRP 50.

As an example, consider a multiple-input multiple-output (MIMO) multiplexing system where a TRP with M transmit antennas transmits L streams of data, also known as "layers" of data, to a UE with N antennas. This system is called an M×N MIMO multiplexing system where the number of data layers L cannot exceed the minimum of M and N, i.e., L<min{M,N}. Therefore, in order for the UE 55 to be able to use a smaller number of antennas, the number of data layers may have to be reduced. A time period (e.g., interval) that a UE communicates with a reduced number of data layers is called a reduced-layer communication interval (RLCI) hereafter. Communication between a TRP 50 and a UE 55 is called reduced-layer communication during an RLCI and is called full-layer communication otherwise (or a full-layer communication interval (FLCI)).

For example, consider a 2×2 MIMO multiplexing system, e.g., a TRP 50 and a UE 55 each with 2 antennas (producing the beams 51-53 for the TRP 50 and beams 56-59 for the UE 55). When the UE 55 uses both of its antennas (represented by beams 56, 57), the TRP 50 can transmit 2 data layers to the UE 55. However, if the UE 55 uses only one antenna (represented by beam 58), the TRP 50 cannot transmit more than 1 data layer to the UE 55. Therefore, the TRP 50 can schedule 2-layer communication for regular communication with the UE 55, but switch to 1-layer communication during RLCIs.

Similarly, the MIMO multiplexing system can be a 4×4 or an 8×8 MIMO multiplexing system. Accordingly, for a 4×4 MIMO, the TRP 50 can schedule 4-layer, 3-layer or 2-layer communication for regular communications with the UE 55, but switch to 3-layer, 2-layer or 1-layer communication during RLCIs.

It should be noted that reduced-layer communication is a special case of a reduced antenna communication. Reduced-layer communication and full-layer communication can be generalized as reduced-antenna communication and full-antenna communication. In other words, reduced-antenna communication and full-antenna communication mean a communication with a subset of antennas and a communication with all of the antennas, respectively. An example of reducing the number of antennas without reducing the number of layers is MIMO diversity schemes where multiple antennas are used to provide a high quality signal for one data layer. In such schemes, decreasing the number of antennas for one data layer reduces the average signal quality for that data layer while increasing the number of antennas for that data layer increases the average signal quality for that data layer. As will be discussed in details later in this document, reducing the number of antennas without reducing the number of layers may still demand separate beamforming and CSI acquisition processes, each corresponding to a certain number of antennas.

If the TRP configures the RLCIs periodically or semi-persistently, the UE can switch to a lower rank automatically without requiring the TRP to schedule a lower-rank communication for each RLCI.

A special case of an RLCI is a 0-layer RLCI, which is essentially a time gap when a UE can use all its antennas for detection of sync signals from other directions. For example, in order to schedule an RLCI for a UE with only 1 antenna, a TRP needs to schedule time gaps for which no communication is scheduled with the UE.

When a TRP has a larger number of antennas, the TRP can communicate with more than one UE simultaneously. This scheme is called multiuser-MIMO (MU-MIMO). An example of MU-MIMO during an RLCI is as follows: consider a system of one TRP having 2 antennas and two UEs, each with 2 antennas. The TRP can schedule 2×2 MIMO multiplexing communication with each UE. If, for example, all the bandwidth is allocated to one UE at a time, communication between the TRP and each UE is scheduled at a separate time period. However, the TRP may choose to schedule an RLCI for MU-MIMO with both of the UEs simultaneously. During the RLCI, the TRP schedules two 1-layer communication, each layer with one of the UEs. Since communication with each of the UEs needs only one UE antenna, each UE is free to use the other antenna for detection of sync signals from other directions.

RLCI scheduling is the process of determining and signaling an RLCI duration, an inter-RLCI period, a number of layers for reduced-layer communication during an RLCI, and other RLCI parameters between a TRP and a UE. RLCIs may be scheduled and signaled by the TRP, but other variations are not precluded.

Figure 6:
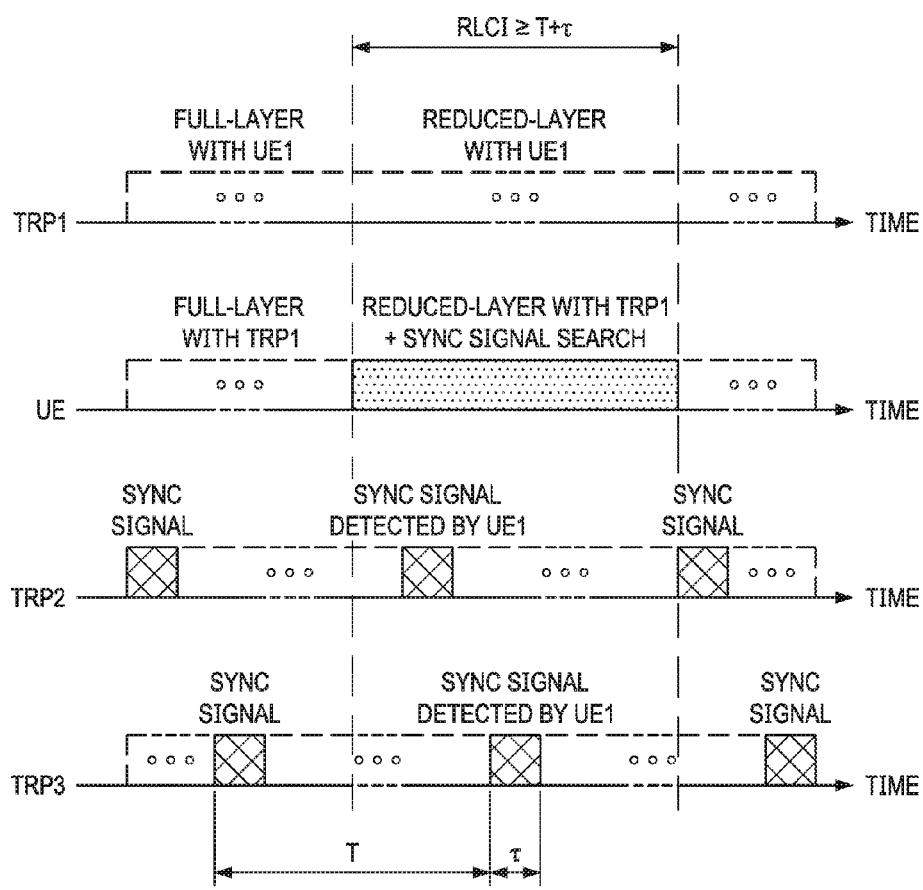
FIG. 6 illustrates an example of RLCI scheduling according to embodiments.

FIG. 6 shows several embodiments of an RLCI scheduling:

In one embodiment, a TRP schedules the RLCIs for a UE persistently or semi-persistently at fixed inter-RLCI periods. The duration of each RLCI and the inter-RLCI periods can be signaled to the UE explicitly or implicitly through, for example, gaps in communications scheduled with that UE. Duration of an RLCI can be chosen in a way that reduces the probability that a UE misses to detect a sync signal transmission by a nearby TRP. For example, if nearby TRPs transmit sync signals in periods of less than or equal to T, and if the duration of transmitting a sync signal is $\tau$, then the TRP may choose to schedule an RLCI with a minimum duration of T+$\tau$.

As can be seen from FIG. 6, UE is served by TRP1. During RLCI, UE can use some or all of its antennas (layers) to detect sync signals from other TRPs, e.g., TRP2 and TRP3.

In further embodiments, if the values of T and $\tau$ are different from one TRP to another TRP in a vicinity of the UE, a minimum RLCI duration equal to the maximum of T+$\tau$ over various TRPs can be considered as a safe bet.

In yet further embodiments, if a TRP transmits sync signal(s) to one or more certain directions during the period $\tau$ and it takes a period of n×T to cover all the directions, a minimum RLCI duration of n×T+$\tau$ can be considered as a safe bet.

In various embodiments, if the RLCI duration is shorter than the minimum RLCI duration determined by the aforementioned embodiments, inter-RLCI periods may be chosen variably. Such a procedure may increase the probability of a UE detecting a sync signal from a nearby TRP successfully. For example, if sync signals are transmitted by a nearby TRP at periods of T and the RLCI duration $\tau$ is only T/2, if RLCIs are scheduled at periods of every n×T where n is an integer, a UE may miss all sync signal transmissions by the nearby TRP. In this example, inter-RLCI periods may be chosen variably to increase the probability of the UE detecting a sync signal from the nearby TRP. This method can be implemented by the TRP and/or triggered by the UE itself.

In the aforementioned embodiments, information about sync signal transmissions by nearby TRPs such as the duration of the transmissions ($\tau$) and the period between the transmissions (T) may be either predetermined or obtained through the network (backhaul) or obtained through UE reports or other methods.

Triggering RLCI Scheduling

In the following, several embodiments for triggering RLCI scheduling are provided.

In one embodiment, RLCI scheduling may be periodic determined by preset system parameters. A simple example is when all TRPs in a vicinity have similar preset values for sync signal transmission duration (τ) and the period between sync signal transmissions (T). In this case, the TRP can signal periodic RLCIs persistently or semi-persistently to a UE.

In another embodiment, RLCI scheduling may be aperiodic triggered by a TRP as a function of various system parameters such as traffic, possibly variable parameters of sync signal transmission by nearby TRPs, signal quality between the TRP and a UE that makes a handover more likely, or other factors.

In yet another embodiment, RLCI scheduling may be aperiodic triggered by a UE as a function of signal quality between the UE and its serving TRP that makes a handover more likely, or other factors.

In yet another embodiment, RLCI scheduling may be a combination of the aforementioned embodiments. For example, periodic RLCIs may be scheduled by a TRP, but additional aperiodic RLCIs may be triggered by the TRP or a UE.

Feedback for Reduced-Layer Communication

A MIMO multiplexing system normally requires channel state information (CSI) between antennas of a transmitter and antennas of a receiver. This information may include channel quality indicators (CQIs), precoding matrix indicators (PMIs), rank indicators (RIs), or other information. Depending on the multiplexing scheme, this information is normally provided for the transmitter and possibly provided for the receiver. When the transmitter and/or the receiver use directional antennas that employ, for example, analog beamforming, the quality of the channel for MIMO multiplexing usually depends on the beams adopted by each antenna. One of the factors that may determine which beams provide a higher channel quality is the number of multiplexed data layers. Therefore, in order to realize efficient reduced-layer communication, CSI for a smaller number of layers may be required or be beneficial in addition to CSI for full-layer communication.

Figure 7A:
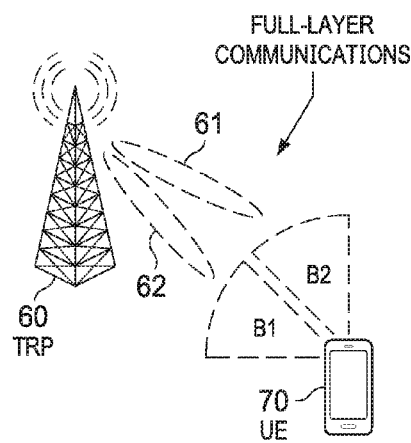
FIGS. 7A and 7B illustrate a beam (B1) applied by an antenna in reduced-layer communications being identical to the beam (B1) applied by that antenna for full-layer communication according to an embodiment.
Figure 7B:
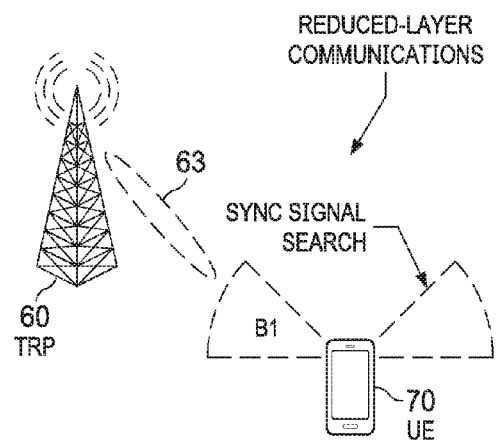

A TRP 60 and a UE 70 reduce the number of communication layers by simply using a subset of antennas used for full-layer communication. FIGS. 7 (A and B) and 8 (A and B) show a TRP 60 with antennas employing beamforming for a plurality of beams (e.g., beams 61, 62, 63, wherein beam 63 can be either beam 61 or beam 62, or different from bean 61 and beam 62) and the UE 70 having antennas employing beamforming for a plurality of beams (e.g., two beams B1, B2). Of course, the TRP 60 and the UE 70 can have more than two antennas and therefore provide more than two beams (e.g., four beams or eight beams). Data (e.g., bearer data) can be transmitted between the TRP 60 and the UE 70 via the beams 61, 62, B1, B2.

In an embodiment, for FIGS. 7 (A and B), when in reduced-layer communication a beam B1 from the plurality of beams B1, B2 provided by the UE antenna can be chosen identical to the beam B1 applied by that antenna for full-layer communication. Accordingly, the beam B1 generated by an antenna of the UE 70 in reduced-layer communication is identical to the beam B1 generated by that antenna of the UE 70 for full-layer communication. The subset of antennas selected for reduced-layer communication can be selected by the TRP 60 or the UE 70 or it can be negotiated through signaling.

Figure 8A:
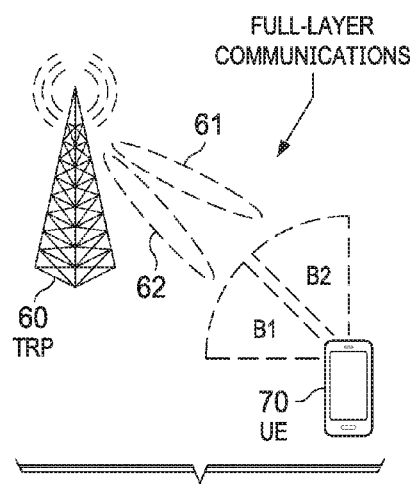
FIGS. 8A and 8B illustrate a beam (B3) applied by an antenna in reduced-layer communications being different from the beam (B1) applied by that antenna for full-layer communication according to an embodiment.
Figure 8B:
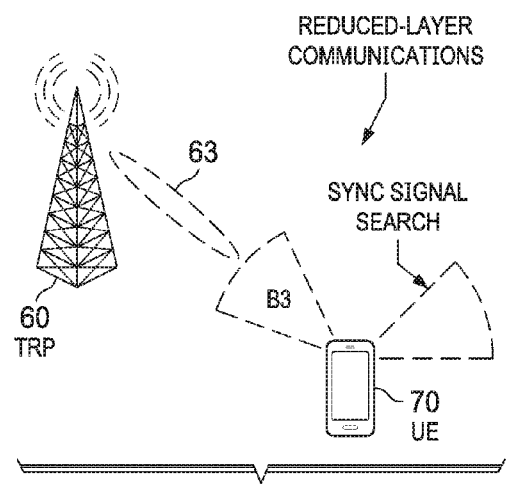

In another embodiment, the TRP 60 and the UE 70 perform separate channel measurements and/or separate (analog) beamforming training for full-layer and reduced-layer communication. If the UE 70 needs to report the CSI to the TRP 60, or vice versa, separate reports can be sent for full-layer and reduced-layer communication. FIGS. 8A and 8B illustrate that the UE 70 can switch from beams B1, B2 in full-layer communication to a beam B3 generated by an antenna of the UE 70 in reduced-layer communication. The beam B3 is different from the beam B1 or B2 generated by that antenna for full-layer communication. The subset of antennas selected for reduced-layer communication can be selected by the TRP 60 or the UE 70 or it can be negotiated through signaling.

Figure 9:
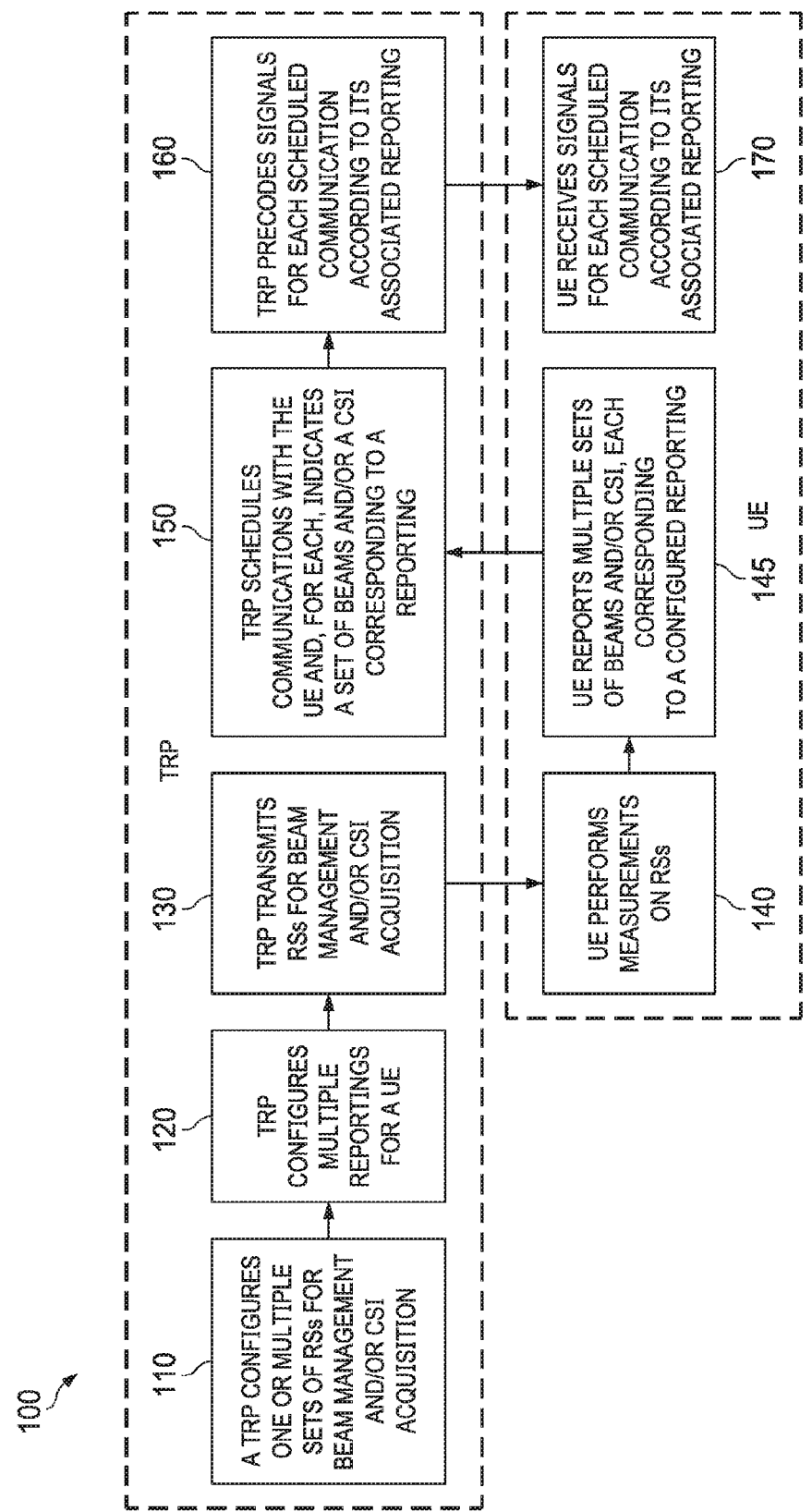
FIGS. 9-11 illustrate a block diagram of an embodiment processing system for performing methods described herein according to embodiments.

FIG. 9 shows a flowchart of method 100 according to an embodiment to realize the embodiment of FIG. 8B. In a first step, at 110, the TRP may configure transmission of one or multiple sets of reference signals (RSs) for beam management and/or CSI acquisition for a connected UE or a group of connected UEs. At 120, the TRP may also configure multiple beam state reporting and/or CSI reporting, where each reporting corresponds to a different subset of antennas. The TRP then transmits RSs for beam management and/or CSI acquisition. This is shown in step 130. At step 140, each UE measures the RSs and, at step 145, each UE reports a set of beams and/or CSIs (i.e., rank indicator (RI), precoding matrix indicator (PMI), channel quality indicator (CQI), and/or so forth) back to the TRP, each corresponding to a different subset of antennas. At 150, the TRP may signal which set of beams and/or CSIs is adopted for each scheduled communication. The TRP may, alternatively, signal which set of beams and/or CSIs is adopted for a scheduled communication only when deviating from a default set of beams and/or CSIs. In yet another embodiment, signaling for a set of beams and/or CSIs may be implicit. An example of this alternative is an RLCI where a UE is implicitly informed that the set of beams and/or CSIs adopted for communication during the interval is different from the default, e.g., different from the full-antenna communication. Moreover, indication of a set of beams to the UE and/or CSIs may be based on quasi-co-location (QCL) indicated between certain antennas. For example, a UE may have acquired and reported beam information and/or CSI on a channel with a subset of antennas, but may need to assume certain set of beams and/or digital precoding corresponding to another subset of antennas. If the two subsets are indicated quasi-co-located (QCLed), then the set of beams and/or digital precoding can be assumed. At 160 the TRP precodes signals for each scheduled communication for the indicated set of beams (according to the associated earlier reporting) from step 150, and, at 170, the UE receives signals for each scheduled communication.

Figure 10:
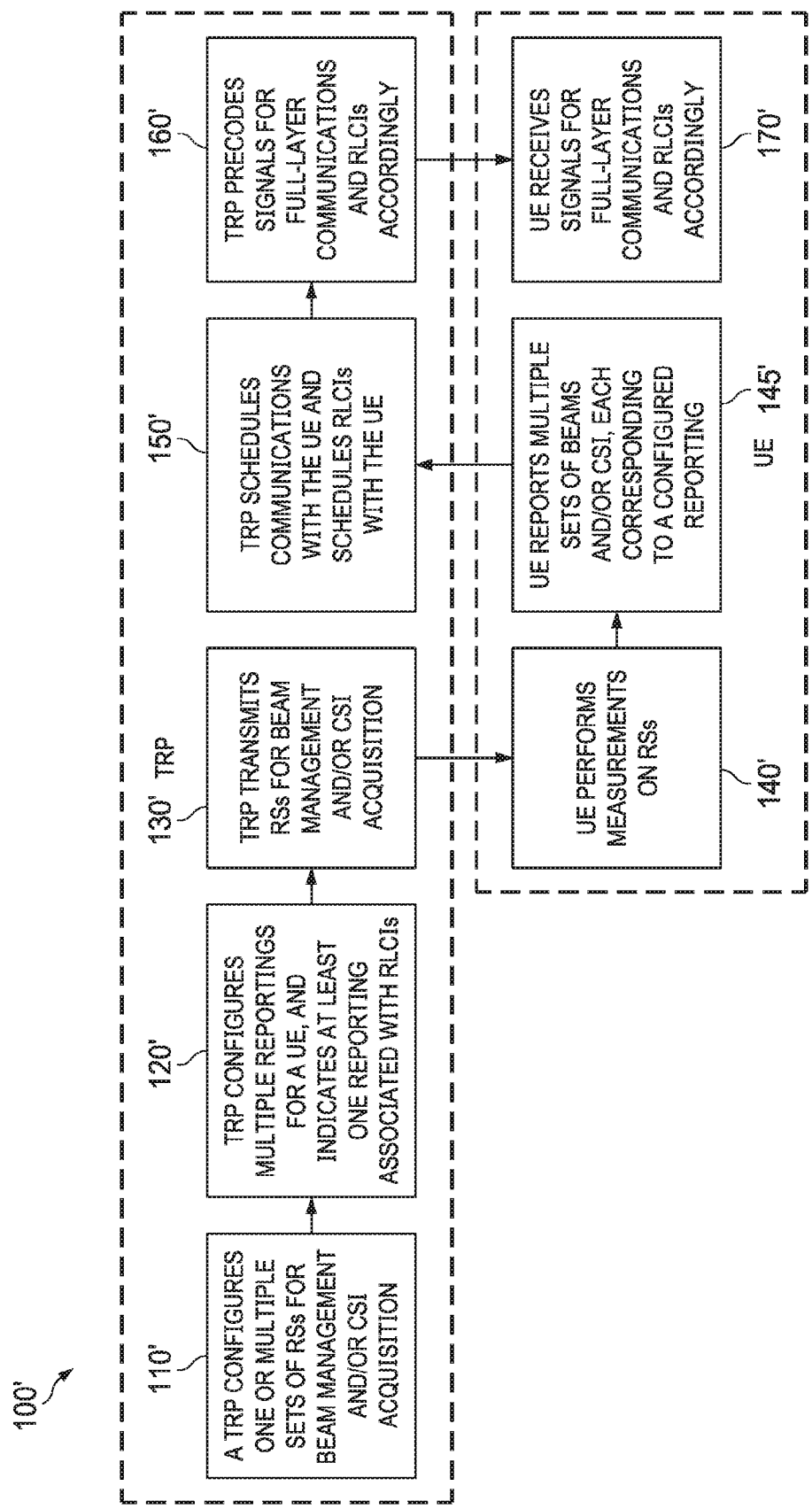

FIG. 10 shows flowchart of method 100' according to an embodiment to realize the embodiment of FIG. 8B. In contrast to the method 100 of the embodiment of FIG. 9, at least one reporting may be associated with RLCI communication. For example, the TRP may indicate to the UE that a reporting from the set of configured reporting is associated with RLCIs at 120'. Then, the UE infers that the set of Rx antennas it selects for the RLCI related reporting and its corresponding measurements may allow the UE to search for sync signals from neighboring cells. When an RLCI is scheduled for the UE, the UE uses the Rx antenna set corresponding to the reporting in order to receive downlink signal from other TRP(s). The TRP transmits RSs for beam management and/or CSI acquisition to the UE at 130'. The UE performs measurements on the RSs at 140' and reports multiple sets of beams and/or CSIs to the TRP, each corresponding to a configured reporting at 145'. This is shown in the flowchart where the TRP indicates precoded signals to the UE for full layer communications and for RLCI communication at 160', and the UE receives these signals for full-layer communication and for RLCI communication accordingly at 170'.

Furthermore, UE capability information such as the number of antennas, analog beamforming capabilities, and so forth can be communicated to the TRP. As an example, a UE that does not perform analog beamforming on any of its antennas may not need to be scheduled any RLCIs, while a UE with one or more antennas that can sweep over a larger number of beams needs more or longer RLCIs scheduled for it. As another example, a UE may dedicate one or more antennas to search for sync signals and dedicate the other antennas to communications with the TRP to which it connects. In this case, the UE may not need any RLCIs scheduled for it. In yet another example, the UE capability can be an indication, for instance, through a single bit, whether or not the UE will require RLCIs. UE capability information can be communicated to a TRP during the connection phase or later after the connection is established. This is shown in the flowchart where the TRP precodes signals full-layer communication and reduced-layer communication accordingly at 160' and the UE receives signals for full-layer communication and reduced-layer communication accordingly at 170'.

Figure 12:
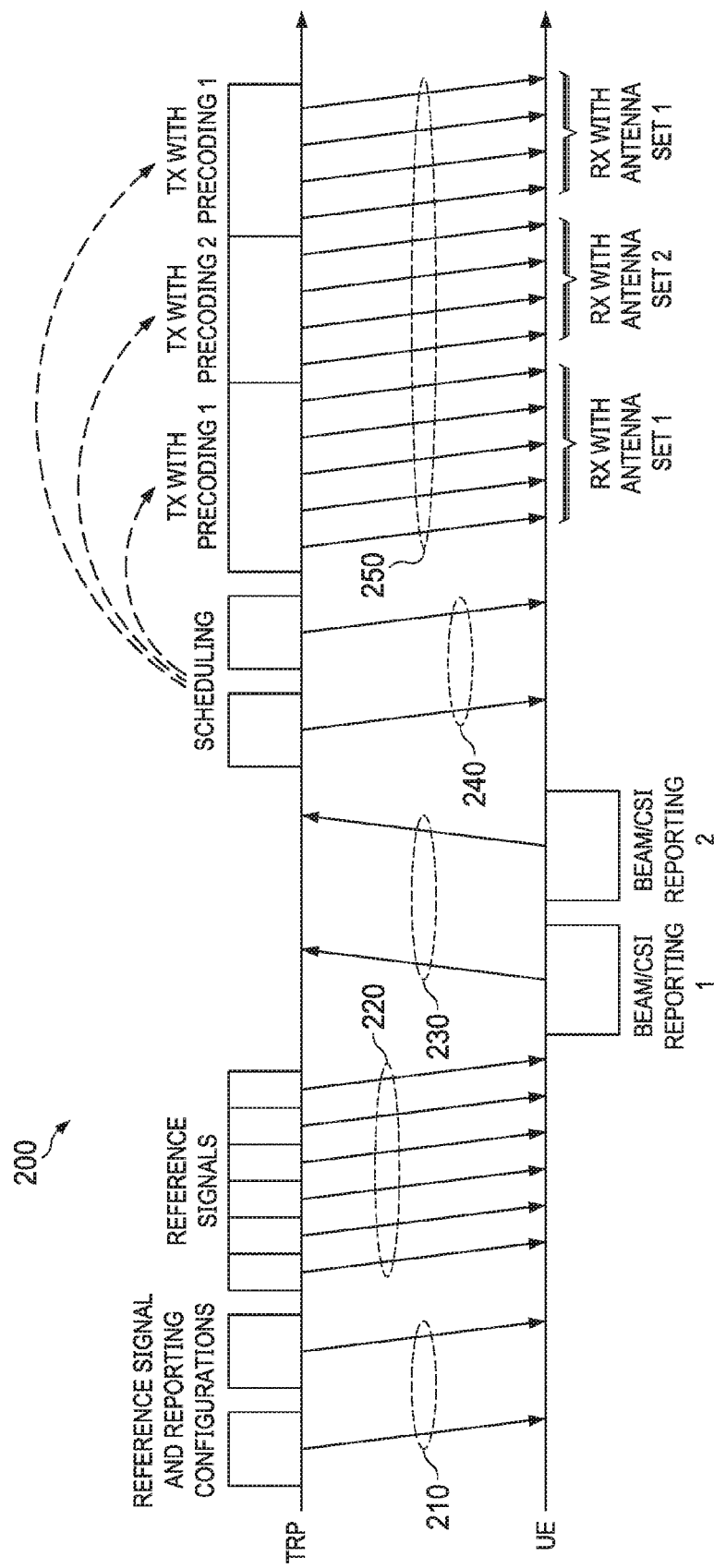
FIG. 12 illustrates a block diagram of a transceiver adapted to transmit and receive signaling over a telecommunications network according to an embodiment.

FIG. 12 shows flowchart of a method 100" according to an embodiment to realize the embodiment of FIG. 8B. In contrast to the methods 100 and 100' the above method 100" is extended to the case that each beam and/or CSI reporting is associated with a communication class. Examples of a communication classes are full-layer communication, reduced-layer communication, communications with a subset of antennas in general, communications at a low rate, communications at a low power, and so forth. Communication classes can be defined in the standard and known to the network and to the UE in advance. Alternatively, communication classes can be defined by the network based on parameters such as the number of antennas required for measurement and reporting, the number of multiplexed communication layers, minimum rate requirements, and so forth. Then, when a reporting is configured for a particular class, at 120", the UE performs measurements and reports beam information and/or CSI according to the class requirements. For example, a full-layer communication class demands the UE to perform measurements through all its antennas while a reduced-layer communication class demands the UE to perform measurements through a subset of its antennas. This is shown in the flowchart where the TRP precodes signals for each scheduled communication according to its communication class at 160" and the UE receives signals for each scheduled communication according to its communication class at 170".

In the above embodiments, when a TRP receives the feedback from a UE, it can then use the feedback to decide about multiple RLCI parameters including inter-RLCI period, RLCI duration, number of layers and the antennas selected for reduced-layer communication, etc. A preferred consideration by the TRP could be to ensure that the number of antennas for reduced-layer communication provides sufficient gain that still allows a minimum channel quality and communication rate between the TPR and the UE.

Figure 11:
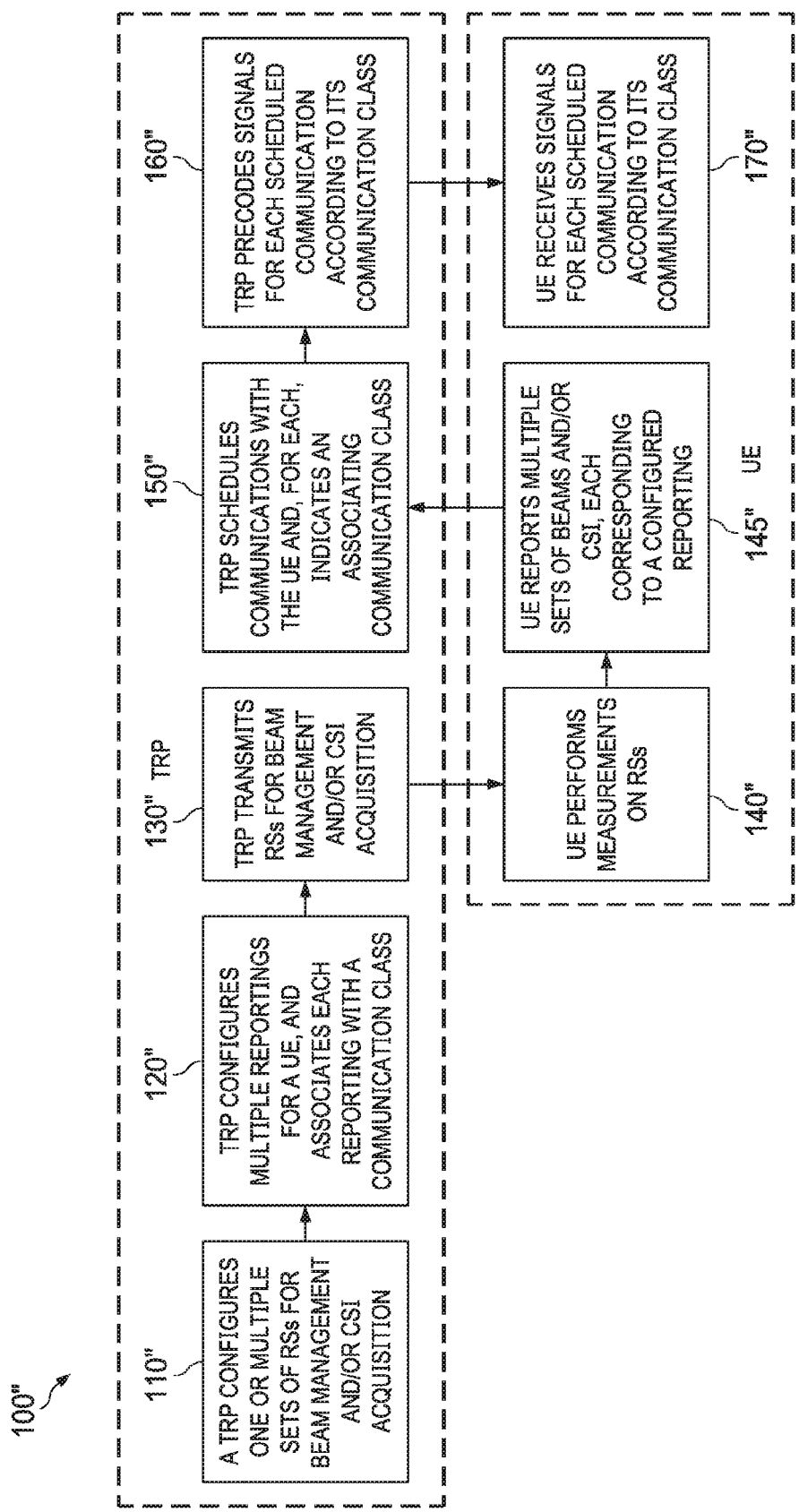

FIG. 12 illustrates a flow chart 200 of a transmission (Tx) and reception (Rx) timeline according to an embodiment for embodiments of FIGS. 9-11. One or multiple configuration messages 210 from the TRP informs a UE of parameters for reference signals for beamforming training and/or CSI acquisition and the corresponding beam and/or CSI reporting requested from the UE. At 220, the TRP sends the reference signals and, at 230, the UE performs measurements on the reference signals and reports multiple sets of beams and/or CSIs as configured by the TRP. Thereafter, at 240, the TRP schedules the communication with the UE and, at 250, precodes each communication to the UE in accordance with either of the reports from the UE. An index corresponding to precoding for each communication should be indicated to the UE, implicitly or explicitly, by the TRP. If the index is indicated explicitly it is done during scheduling at 240. If it is done implicitly it is done, for example, during communication at 250. A special case of such a scenario is where an RLCI overlaps with a full-layer communication. An example of this case is the example of FIG. 12 where reporting 1, Tx precoding 1, and Rx antenna set 1 correspond to full-layer communication while reporting 2, Tx precoding 2, and Rx antenna set 2 correspond to reduced-layer communication. Note that the word 'reporting' is a short version of beam information reporting and/or a CSI reporting.

Spreading Sync Signals

In embodiments, TRPs multiply sync signals by spreading sequences. The spreading sequence(s) should be sufficiently long to boost the signal-to-interference-plus-noise ratio (SINR) for reception from directions suppressed by the directional antenna(s) at the UE. A special case is simple repetition of the sync signals. The UE may be aware of the spreading sequence(s) and, for example, use matched filtering to "de-spread" the received signals. If more than one spreading sequence is used for this purpose in the system, different spreading sequences can be used to communicate additional information such as TRP-specific or beam-specific IDs.

Erasure-Tolerant Transmissions

In yet another embodiment, downlink (DL) transmissions by the TRP are erasure-tolerant, i.e., the UE is able to receive/decode DL data even if it partially misses the DL signals. Therefore, the UE will be able to search for sync signals from other TRPs while DL transmissions are ongoing. There are multiple ways to realize an erasure-tolerant DL transmission.

(1) Additional redundancy: By adding redundancy, i.e., lowering the code rate, the UE can search for sync signals from other TRPs. A simple example is repetition coding where each symbol or group of symbols is transmitted multiple times, which allows the UE to search for incoming sync signals from other directions and attempt to receive other copies of the missed symbol or group of symbols at an earlier or later time.

(2) Rate-less coding: If a TRP employs rate-less codes such as fountain codes, the UE can listen to its serving TRP and attempt to decode the signal after receiving each symbol or group of symbols. Once the UE is able to decode the signal, it can change its receive beam to search for sync signals from other directions. In this approach, the UE's ability to search for sync signals depends on whether and when it succeeds in decoding the rate-less codes.

(3) Non-consecutive resource allocation: If the resources allocated to a DL transmission are not consecutive, the UE can search for sync signals from other TRPs at the time instants that no resources are allocated to it.

(4) Spreading: DL signals can be spread by multiplying the signals by a spreading sequence. The spread signals, then, need to be de-spread at the UE. If UE does not receive a part of the signals, it may still be able to recover the signal, possibly at a lower signal-to-noise ratio (SNR).

Any such method can be implemented by the TRP or triggered/requested by the UE.

Exploration vs. exploitation: In the aforementioned embodiment, a UE can choose to maintain a balance between "exploration," i.e., searching for sync signals from other directions, and "exploitation," i.e., using the established link with its serving TRP for communications, as it may take different performance and complexity criteria into account. For example, on the one hand, excessive exploration provides a better link quality that may be underutilized; on the other hand, excessive exploitation increases the period of utilizing a link for communications, but the link may not provide the highest channel quality available.

TRP-Aware Cell Search

In yet another embodiment, a TRP can schedule resources for each UE it is serving so that each UE will be able to perform sync signal acquisition from other directions in a timely manner. To this end, the TRP ensures that: each UE is allowed to perform sync signal acquisition from other directions sufficiently frequently; no UE is allocated resources frequently at a period of T/n where T is the period of transmitting sync signals by TRPs in the vicinity and n is any positive integer; and each UE is informed of the possibility of performing sync signal acquisition from other directions without losing a communication opportunity with its serving TRP.

The information about sync signal transmissions from neighboring TRPs may be acquired by the serving TRP through a backhaul or over the air by overhearing sync signals from the neighboring TRPs.

Employing Deliberately Large Side-Lobes

In another embodiment, a UE can deliberately employ beam patterns that have large side-lobes in order to be able to receive signals from other directions. The side-lobes can be designed to control the amount of interference the UE receives from undesired directions, but still allow sufficiently large signal strength for detection of sync signals.

A UE may choose to employ large-side-lobe beam patterns at all times or at specific time periods it chooses. This can be configured by a TRP serving the UE and/or triggered by the UE itself.

Figure 13:
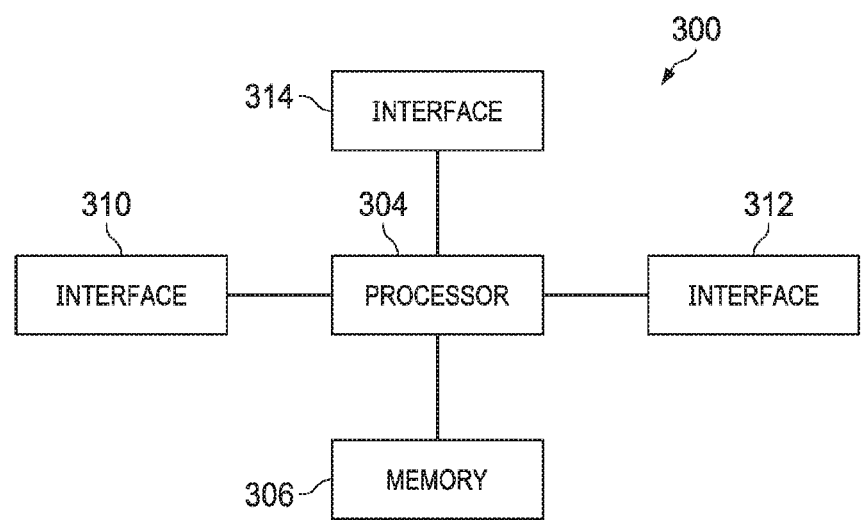
FIG. 13 illustrates a block diagram of an embodiment processing system for performing methods described herein.

FIG. 13 illustrates a block diagram of an embodiment processing system 300 for performing methods described herein, which may be installed in a host device. As shown, the processing system 300 includes a processor 304, a memory 306, and interfaces 310-314, which may (or may not) be arranged as shown in the figure. The processor 304 may be any component or collection of components adapted to perform computations and/or other processing related tasks, and the memory 306 may be any component or collection of components adapted to store programming and/or instructions for execution by the processor 304. In an embodiment, the memory 306 includes a non-transitory computer readable medium. The interfaces 310, 312, 314 may be any component or collection of components that allow the processing system 300 to communicate with other devices/components and/or a user. For example, one or more of the interfaces 310, 312, 314 may be adapted to communicate data, control, or management messages from the processor 304 to applications installed on the host device and/or a remote device. As another example, one or more of the interfaces 310, 312, 314 may be adapted to allow a user or user device (e.g., personal computer (PC), etc.) to interact/communicate with the processing system 300. The processing system 300 may include additional components not depicted in the figure, such as long term storage (e.g., non-volatile memory, etc.).

In some embodiments, the processing system 300 is included in a network device that is accessing, or part otherwise of, a telecommunication network. In one example, the processing system 300 is in a network-side device in a wireless or wireline telecommunication network, such as a base station, a relay station, a scheduler, a controller, a gateway, a router, an applications server, or any other device in the telecommunication network. In other embodiments, the processing system 300 is in a user-side device accessing a wireless or wireline telecommunication network, such as a mobile station, a user equipment (UE), a personal computer (PC), a tablet, a wearable communication device (e.g., a smartwatch, etc.), or any other device adapted to access a telecommunication network.

In some embodiments, one or more of the interfaces 310, 312, 314 connects the processing system 300 to a transceiver adapted to transmit and receive signaling over the telecommunication network.

Figure 14:
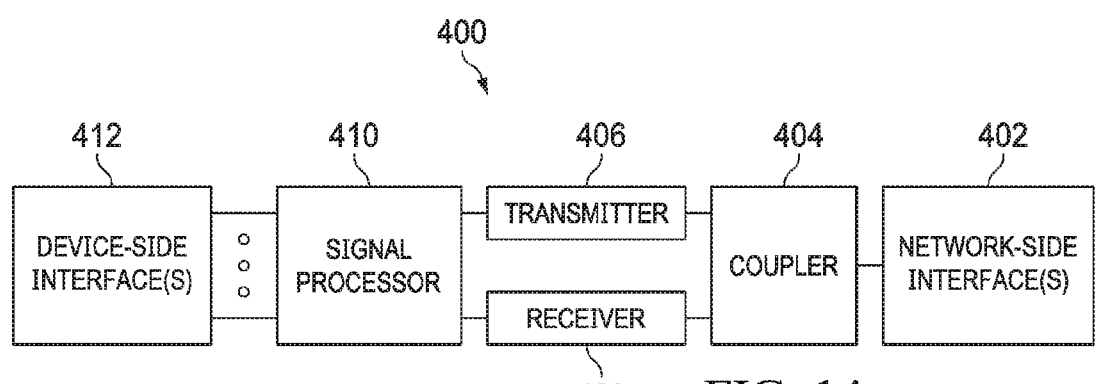
FIG. 14 illustrates a block diagram of a transceiver adapted to transmit and receive signaling over a telecommunications network.

FIG. 14 illustrates a block diagram of a transceiver 400 adapted to transmit and receive signaling over a telecommunication network. The transceiver 400 may be installed in a host device. As shown, the transceiver 400 comprises a network-side interface 402, a coupler 404, a transmitter 406, a receiver 408, a signal processor 410, and a device-side interface 412. The network-side interface 402 may include any component or collection of components adapted to transmit or receive signaling over a wireless or wireline telecommunication network. The coupler 404 may include any component or collection of components adapted to facilitate bi-directional communication over the network-side interface 402. The transmitter 406 may include any component or collection of components (e.g., up-converter, power amplifier, etc.) adapted to convert a baseband signal into a modulated carrier signal suitable for transmission over the network-side interface 402. The receiver 408 may include any component or collection of components (e.g., down-converter, low noise amplifier, etc.) adapted to convert a carrier signal received over the network-side interface 402 into a baseband signal. The signal processor 410 may include any component or collection of components adapted to convert a baseband signal into a data signal suitable for communication over the device-side interface(s) 412, or vice-versa. The device-side interface(s) 412 may include any component or collection of components adapted to communicate data-signals between the signal processor 410 and components within the host device (e.g., the processing system 300, local area network (LAN) ports, etc.).

The transceiver 400 may transmit and receive signaling over any type of communication medium. In some embodiments, the transceiver 400 transmits and receives signaling over a wireless medium. For example, the transceiver 400 may be a wireless transceiver adapted to communicate in accordance with a wireless telecommunication protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 402 comprises one or more antenna/radiating elements. For example, the network-side interface 402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a processing unit/module, a storage unit/module, a synchronization unit/module, etc. The respective units/modules may be hardware, software, or a combination thereof. For instance, one or more of the units/modules may be an integrated circuit, such as field programmable gate arrays (FPGAs) or application-specific integrated circuits (ASICs).

The following embodiments and aspects of the disclosure and can be combined in a possible combination and permutation.

In a first embodiment a method for wireless communication is disclosed. The method comprises transmitting, by a network controller, reference signals (RS) for beam management to a user equipment (UE), receiving, by the network controller, a plurality of reported beams from the UE and signaling, by the network controller, scheduling instructions to the UE based on the received beams so that the UE is configured to search for synchronization signals with at least one first beam using a first antenna set while still being able to receive bearer data with at least one second beam using a second antenna set during a first time period for synchronization, wherein the first antenna set and the second antenna set are non-overlapping.

According to a first aspect of the disclosure the RS for beam management comprises RS for channel state information (CSI) acquisition.

According to a second aspect of the disclosure, the first antenna set transmits a first number of data layers and the second antenna set transmits a second number of data layers, wherein the first and second numbers of data layers are equal or smaller than the first and second antenna sets, respectively.

According to a third aspect of the disclosure, receiving the scheduling instructions comprises receiving the scheduling instructions so that the UE is configured to receive bearer data via at least one third beam and at least one fourth beam during a second time period, wherein the second time period is a time period where the UE does not search for a synchronization signal.

According to a fourth aspect of the disclosure, the at least one third beam is the same as the at least one first beam, and the at least one fourth beam is the same as the at least one second beam.

According to a fifth aspect of the disclosure, the at least one third beam and the at least one fourth beam are different than the at least one first beam.

According to a sixth aspect of the disclosure, the at least one third beam is the same as the at least one first beam, and the at least one second beam is different than the at least one fourth beam.

According to a seventh aspect of the disclosure, the first time period is larger than T+τ, where T denotes a periodicity of a transmission of synchronization signals of the network controller and τ denotes a duration of a transmission of synchronization signals of the network controller.

According to a eight aspect of the disclosure, the first time period is equal to T+τ, where T denotes a periodicity of a transmission of synchronization signals of the network controller and τ denotes a duration of a transmission of synchronization signals of the network controller.

According to a ninth aspect of the disclosure, the plurality of reported beams comprises CSIs for beams for a full-layer communication and CSIs for beams for a reduced-layer communication interval.

According to a tenth aspect of the disclosure, the network controller signals a different beam for full-layer communication to the UE than for reduced layer communication.

According to an eleventh aspect of the disclosure, the plurality of reported beams comprises beams associated with a first communication class and beams associated with a second communication class.

According to a twelfth aspect of the disclosure, the plurality of reported beams comprises separate CSIs for beams associated with a first communication class and beams associated with a second communication class.

In a second embodiment a method for wireless communication is disclosed. The method comprises receiving, by a user equipment (UE), reference signals (RS) for beam management from a network controller, reporting, by the UE, a plurality of beams to the network controller and receiving, by the UE, scheduling instructions from the network controller based on the sent beams so that the UE is configured to search for synchronization signals with at least one first beam using a first antenna set while still being able to receive bearer data with at least one second beam and using a second antenna set during a first time period for synchronization, wherein the first antenna set and the second antenna set are non-overlapping.

According to a first aspect of the disclosure, the RS for beam management comprises a RS for channel state information (CSI) acquisition.

According to a second aspect of the disclosure, the first antenna set transmits a first number of data layers and the second antenna set transmits a second number of data layers, wherein the first and second numbers of data layers are equal or smaller than the first and second antenna sets, respectively.

According to a third aspect of the disclosure, receiving the scheduling instructions comprises receiving the scheduling instructions so that the UE is configured to receive bearer data via at least one third beam and at least one fourth beam during a second time period, wherein the second time period is a time period where the UE does not search for a synchronization signal.

According to a fourth aspect of the disclosure, the at least one third beam is the same as the at least one first beam and the at least one fourth beam is the same as the at least one second beam.

According to a fifth aspect of the disclosure, the at least one third beam and the at least one fourth beam are different than the at least one first beam.

According to a sixth aspect of the disclosure, the at least one third beam is the same as the at least one first beam and the at least one fourth beam is a beam or set of beams different than the at least one second beam.

According to the seventh aspect of the disclosure, the first time period is larger than T+τ, where T denotes a periodicity of a transmission of synchronization signals of the network controller and τ denotes a duration of a transmission of synchronization signals of the network controller.

According to the eighth aspect of the disclosure, the first time period is equal to T+τ, where T denotes a periodicity of a transmission of synchronization signals of the network controller and τ denotes a duration of a transmission of synchronization signals of the network controller.

According to the ninth aspect of the disclosure, the plurality of reported beams comprises separate CSIs for beams for a full-layer communication from and beams for a reduced-layer communication interval.

According to the tenth aspect of the disclosure, the UE receives a different beam allocation for full-layer communication from the network controller than for reduced layer communication.

According to an eleventh aspect of the disclosure, the plurality of reported beams comprises beams associated with a first communication class and beams associated with a second communication class.

According to a twelfth aspect of the disclosure, the plurality of reported beams comprises separate CSIs for beams associated with a first communication class and beams associated with a second communication class.

In a third embodiment a method for wireless communication is disclosed. The method comprises synchronizing, by a first network controller, transmission of a first synchronization signal with transmission of a second synchronization signal from another network controller.

In a fourth embodiment a non-transitory memory storage is disclosed. The memory storage comprises instructions and one or more processors in communication with the memory. The one or more processors execute the instructions for synchronizing transmission of a first sync signal with transmission of a second sync signal by another TRP.

In a fifth embodiment a network controller is disclosed. The network controller comprises a processor and a non-transitory computer readable storage medium storing programming for execution by the processor, the processor executes instructions for transmitting reference signals (RS) for beam management to a user equipment (UE), receiving a plurality of reported beams from the UE and signaling scheduling instructions to the UE based on the received beams so that the UE is configured to search for synchronization signals with at least one first beam using a first antenna set while still being able to receive bearer data with at least one second beam using a second antenna set during a first time period for synchronization, wherein the first antenna set and the second antenna set are non-overlapping.

In a sixth embodiment a user equipment (UE) is disclosed. The UE comprises a processor and a non-transitory computer readable storage medium storing programming for execution by the processor, the processor executes instructions for receiving reference signals (RS) for beam management from a network controller, reporting a plurality of beams to the network controller and receiving scheduling instructions from the network controller based on the sent beams so that the UE is configured to search for synchronization signals with at least one first beam using a first antenna set while still being able to receive bearer data with at least one second beam and using a second antenna set during a first time period for synchronization, wherein the first antenna set and the second antenna set are non-overlapping.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for wireless communication, the method comprising:
   transmitting, by a network controller, reference signals (RS) for beam management to a user equipment (UE);
   receiving, by the network controller, a plurality of reported beams from the UE; and
   signaling, by the network controller, scheduling instructions to the UE based on the received beams so that the UE is configured to search for synchronization signals with at least one first beam using a first antenna set while still being able to receive bearer data with at least one second beam using a second antenna set during a first time period for synchronization, wherein the first antenna set and the second antenna set are non-overlapping.

2. The method according to claim 1, wherein the RS for beam management comprises a RS for channel state information (CSI) acquisition.

3. The method according to claim 1, wherein the first antenna set transmits a first number of data layers and the second antenna set transmits a second number of data layers, and wherein the first and second numbers of data layers are equal or smaller than the first and second antenna sets, respectively.

4. The method according to claim 1, wherein receiving the scheduling instructions comprises receiving the scheduling instructions so that the UE is configured to receive bearer data via at least one third beam and at least one fourth beam during a second time period, and wherein the second time period is a time period where the UE does not search for a synchronization signal.

5. The method according to claim 4, wherein the at least one third beam is the same as the at least one first beam, and the at least one fourth beam is the same as the at least one second beam.

6. The method according to claim 4, wherein the at least one third beam and the at least one fourth beam are different than the at least one first beam.

7. The method according to claim 4, wherein the at least one third beam is the same as the at least one first beam, and the at least one second beam is different than the at least one fourth beam.

8. The method according to claim 1, wherein the first time period is larger than T+τ, where T denotes a periodicity of a transmission of synchronization signals of the network controller and τ denotes a duration of a transmission of synchronization signals of the network controller.

9. The method according to claim 1, wherein the first time period is equal to T+τ, where T denotes a periodicity of a transmission of synchronization signals of the network controller and τ denotes a duration of a transmission of synchronization signals of the network controller.

10. The method according to claim 1, wherein the plurality of reported beams comprises CSIs for beams for a full-layer communication and CSIs for beams for a reduced-layer communication interval.

11. The method according to claim 1, wherein the network controller signals a different beam for full-layer communication to the UE than for reduced layer communication.

12. The method according to claim 1, wherein the plurality of reported beams comprises beams associated with a first communication class and beams associated with a second communication class.

13. The method according to claim 1, wherein the plurality of reported beams comprises separate CSIs for beams associated with a first communication class and beams associated with a second communication class.

14. A method for wireless communication, the method comprising:
receiving, by a user equipment (UE), reference signals (RS) for beam management from a network controller;
reporting, by the UE, a plurality of beams to the network controller; and
receiving, by the UE, scheduling instructions from the network controller based on the sent beams so that the UE is configured to search for synchronization signals with at least one first beam using a first antenna set while still being able to receive bearer data with at least one second beam and using a second antenna set during a first time period for synchronization, wherein the first antenna set and the second antenna set are non-overlapping.

15. The method according to claim 14, wherein the RS for beam management comprises a RS for channel state information (CSI) acquisition.

16. The method according to claim 14, wherein the first antenna set transmits a first number of data layers and the second antenna set transmits a second number of data layers, and wherein the first and second numbers of data layers are equal or smaller than the first and second antenna sets, respectively.

17. The method according to claim 14, wherein receiving the scheduling instructions comprises receiving the scheduling instructions so that the UE is configured to receive bearer data via at least one third beam and at least one fourth beam during a second time period, and wherein the second time period is a time period where the UE does not search for a synchronization signal.

18. The method according to claim 17, wherein the at least one third beam is the same as the at least one first beam and the at least one fourth beam is the same as the at least one second beam.

19. The method according to claim 17, wherein the at least one third beam and the at least one fourth beam are different than the at least one first beam.

20. The method according to claim 17, wherein the at least one third beam is the same as the at least one first beam and the at least one fourth beam is a beam or set of beams different than the at least one second beam.

21. The method according to claim 14, wherein the first time period is larger than T+τ, where T denotes a periodicity of a transmission of synchronization signals of the network controller and τ denotes a duration of a transmission of synchronization signals of the network controller.

22. The method according to claim 14, wherein the first time period is equal to T+τ, where T denotes a periodicity of a transmission of synchronization signals of the network controller and τ denotes a duration of a transmission of synchronization signals of the network controller.

23. The method according to claim 14, wherein the plurality of reported beams comprises separate CSIs for beams for a full-layer communication and beams for a reduced-layer communication interval.

24. The method according to claim 14, wherein the UE receives a different beam allocation for full-layer communication from the network controller than for reduced layer communication.

25. The method according to claim 14, wherein the plurality of reported beams comprises beams associated with a first communication class and beams associated with a second communication class.

26. The method according to claim 14, wherein the plurality of reported beams comprises separate CSIs for beams associated with a first communication class and beams associated with a second communication class.

* * * * *